US010073720B2

(12) United States Patent
Raman B R et al.

(10) Patent No.: US 10,073,720 B2
(45) Date of Patent: Sep. 11, 2018

(54) RESTRICTED APPLICATION VISIBILITY

(71) Applicant: AIRWATCH LLC, Atlanta, GA (US)

(72) Inventors: Anantha Raman B R, Bangalore (IN); Nitin Sethi, Bangalore (IN); Subham Kumar Tyagi, Bangalore (IN); Joel Sequeira, Atlanta, GA (US)

(73) Assignee: AIRWATCH, LLC, Atlanta, GA (US)

( * ) Notice: Subject to any disclaimer, the term of this patent is extended or adjusted under 35 U.S.C. 154(b) by 105 days.

(21) Appl. No.: 14/879,105

(22) Filed: Oct. 9, 2015

(65) Prior Publication Data

US 2017/0031737 A1 Feb. 2, 2017

(30) Foreign Application Priority Data

Jul. 30, 2015 (IN) .......................... 3934/CHE/2015

(51) Int. Cl.
*G06F 21/00* (2013.01)
*G06F 9/54* (2006.01)
*H04L 9/32* (2006.01)

(52) U.S. Cl.
CPC ............ *G06F 9/543* (2013.01); *H04L 9/3247* (2013.01); *H04L 2209/24* (2013.01); *H04L 2209/72* (2013.01)

(58) Field of Classification Search
CPC ... G06F 9/543; H04L 9/3247; H04L 2209/24; H04L 2209/72
See application file for complete search history.

(56) References Cited

U.S. PATENT DOCUMENTS

| | | | | |
|---|---|---|---|---|
| 5,634,019 A | * | 5/1997 | Koppolu | G06F 3/0481 715/209 |
| 6,806,892 B1 | * | 10/2004 | Plow | G06F 3/0481 715/766 |
| 7,110,998 B1 | * | 9/2006 | Bhandari | G06F 17/30539 |
| 7,478,142 B1 | * | 1/2009 | Veditz | G06F 9/445 709/218 |
| 7,783,967 B1 | * | 8/2010 | Carnell | G06F 17/3089 715/234 |
| 7,846,023 B2 | * | 12/2010 | Evans | A63F 13/12 463/42 |
| 7,950,026 B1 | * | 5/2011 | Urbach | G09G 5/14 715/733 |

(Continued)

*Primary Examiner* — Techane Gergiso
(74) *Attorney, Agent, or Firm* — Thomas Horstemeyer, LLP

(57) ABSTRACT

Disclosed are various examples of providing a secured application launcher for initiating execution of access-restricted applications. A computer disables a default launch activity alias for a user application, wherein the default launch activity alias comprises a first reference to an application programming interface (API) to initiate execution of the user application. The computer then queries the user application for a presence of a container activity alias provided by the user application, wherein the container activity alias comprises a second reference to the API to initiate execution of the user application. The computer then displays an application icon representing the user application based at least in part on the presence of the container activity alias. The computer then calls the container activity alias for the user application based at least in part on a manipulation of the application icon.

20 Claims, 5 Drawing Sheets

(56) References Cited

U.S. PATENT DOCUMENTS

| | | | | |
|---|---|---|---|---|
| 8,997,081 B1* | 3/2015 | Manion | G06F 8/65 | 717/168 |
| 9,244,673 B2* | 1/2016 | Chinn | G06F 8/65 | |
| 9,483,636 B2* | 11/2016 | Iskin | G06F 21/51 | |
| 9,513,936 B2* | 12/2016 | Gallimore | G06F 9/44521 | |
| 2004/0172443 A1* | 9/2004 | Alcazar | G06F 9/44526 | 709/200 |
| 2006/0224989 A1* | 10/2006 | Pettiross | G06F 3/0483 | 715/779 |
| 2009/0055749 A1* | 2/2009 | Chatterjee | G06F 3/04817 | 715/738 |
| 2010/0162126 A1* | 6/2010 | Donaldson | G06F 17/30902 | 715/738 |
| 2012/0059876 A1* | 3/2012 | Chinta | G06F 21/53 | 709/203 |
| 2012/0233522 A1* | 9/2012 | Barton | H04L 67/06 | 714/758 |
| 2013/0031462 A1* | 1/2013 | Calvo | G06F 9/545 | 715/234 |
| 2013/0160126 A1* | 6/2013 | Kapoor | G06F 21/568 | 726/24 |
| 2013/0239192 A1* | 9/2013 | Linga | G06F 21/44 | 726/7 |
| 2014/0007222 A1* | 1/2014 | Qureshi | G06F 21/10 | 726/16 |
| 2014/0032691 A1* | 1/2014 | Barton | H04L 41/00 | 709/206 |
| 2014/0059599 A1* | 2/2014 | Sirpal | H04N 5/44 | 725/37 |
| 2014/0337528 A1* | 11/2014 | Barton | H04L 41/00 | 709/225 |
| 2015/0026608 A1* | 1/2015 | Wu | G06F 9/445 | 715/762 |
| 2015/0058972 A1* | 2/2015 | Wang | G06F 21/629 | 726/17 |
| 2015/0089673 A1* | 3/2015 | Beckman | H04L 63/105 | 726/29 |
| 2015/0193452 A1* | 7/2015 | McGrath | G06F 9/541 | 707/783 |
| 2015/0205949 A1* | 7/2015 | Iskin | G06F 21/64 | 713/187 |
| 2015/0261801 A1* | 9/2015 | Barton | H04L 67/06 | 707/697 |
| 2015/0358357 A1* | 12/2015 | Diaz-Tellez | G06F 21/6209 | 726/27 |
| 2016/0055014 A1* | 2/2016 | Gallimore | G06F 9/44521 | 719/320 |
| 2016/0085658 A1* | 3/2016 | Manion | G06F 8/65 | 717/124 |
| 2016/0135006 A1* | 5/2016 | Fjeldsoe-Nielsen | H04B 1/3827 | 455/456.3 |
| 2016/0155477 A1* | 6/2016 | Hughes | G11B 27/30 | 386/241 |
| 2016/0164986 A1* | 6/2016 | Chen | G06F 3/0488 | 715/753 |
| 2016/0342802 A1* | 11/2016 | Xuan | G06F 21/54 | |

\* cited by examiner

RESTRICTED APPLICATION VISIBILITY

CROSS-REFERENCE TO RELATED APPLICATIONS

Benefit is claimed under 35 U.S.C. 119(a)-(d) to Foreign application Serial No. 3934/CHE/2015 filed in India entitled "RESTRICTED APPLICATION VISIBILITY", on Jul. 30, 2015, by AIRWATCH LLC, which is herein incorporated in its entirety by reference for all purposes

BACKGROUND

Companies often allow employees to use their own devices, such as smartphones, for work or business purposes. For example, companies can allow employees to send and receive emails on their personal device using their work email account. However, using personal devices for work or business purposes introduces a number of security concerns, such as limiting access to business applications, data, and services to authorized users.

Employers can impose restrictions upon the use of an employee's personal device for business purposes. For example, an employer can specify that an employee have specific applications installed, that specific options or features be enabled or disabled, or that the employee provide administrative access to the employer. However, these restrictions can hinder or limit the employee's ability to use personal applications and access personal data using his or her personal device in the manner that he or she wishes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for restricting the visibility of individual user applications installed on a mobile computing device. For example, a company can allow employees to use their personal devices for business purposes. However, the company can require that the user install specific applications for use with company data or resources. As an example, the company can require that the user install a separate email client, web-browser, or file viewer for use when sending or receiving business emails, viewing company webpages (e.g., intranet sites) or viewing company files (e.g., spreadsheets, PDF's or other documents). These separate applications can allow the company to restrict and monitor a user's access to company data through the application of one or more policies enforceable on the user's device. Further, the manner of accessing these applications can be restricted to specific user interfaces, as further described below.

Figure 1:
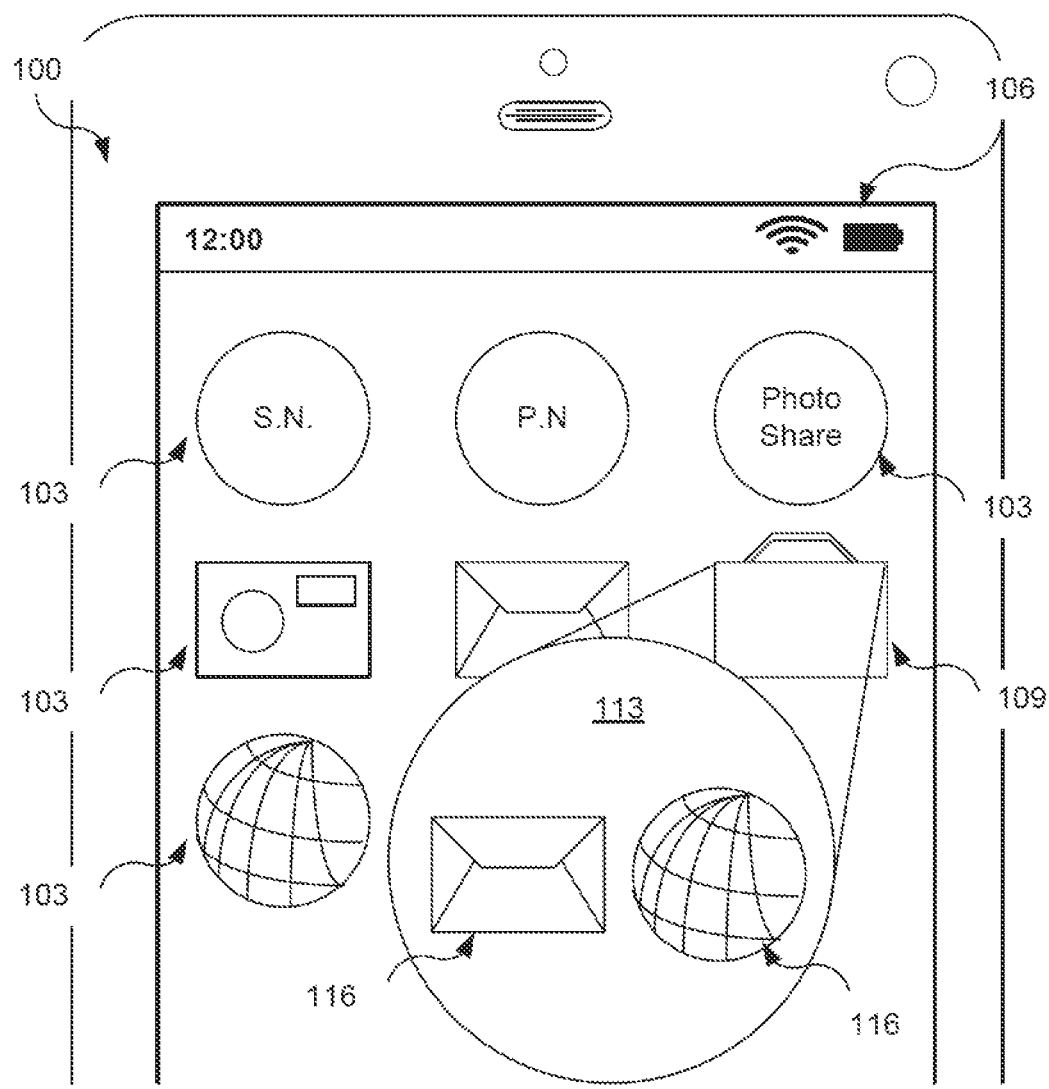
FIG. 1 is a drawing depicting the operation of various examples of the disclosure.

With reference to FIG. 1, the operation of one example of the present disclosure is depicted. A user's personal client device 100, such as a smartphone, tablet, or similar mobile computing device, can display one or more application icons 103 on the screen 106 of the client device 100. For example, a smartphone or tablet running a version of the Android® operating system can display application icons 103 for the various applications installed on the client device 100. Manipulation of the individual application icons 103, such as when a user taps the area of the screen 106 in which an application icon 103 is located, can launch the corresponding application.

A container icon 109 can also be displayed on the screen 106 of the client device 100. The container icon 109 can represent a container application, as further described below. When the container icon 109 is manipulated, an application container 113 can be displayed on the screen 106. One or more access-restricted application icons 116 can be displayed within the application container 113. The access-restricted application icons 116 can correspond to individual access-restricted user applications, such as an enterprise email application, a secure web browser, a secure chat application, a secure file viewer application, or similar applications. When an access-restricted application icon 116 is manipulated, execution of the access-restricted application can begin. For example, if a user taps the area of the screen 106 where an access-restricted application icon 116 is displayed, the corresponding access-restricted application can be launched.

Display of access-restricted application icons 116 can be limited to within the application container 113. In such instances, the access-restricted application icons 116 would be excluded from display within other menus, applications, windows, or similar user interface elements. As an example, if the client device 100 corresponds to a smartphone or tablet running a version of the Android® operating system, display of the access-restricted application icons 116 could be excluded from the Google Play® store or the home screen of the user's device.

Further, the application container 113 can be presented in forms other than those depicted in FIG. 1. For example, display of the application container 113 can encompass the whole screen 106, effectively replacing the content previously displayed on the screen 106. As another example, the application container 113 can be rendered to appear as a directory or sub-directory.

Figure 2:
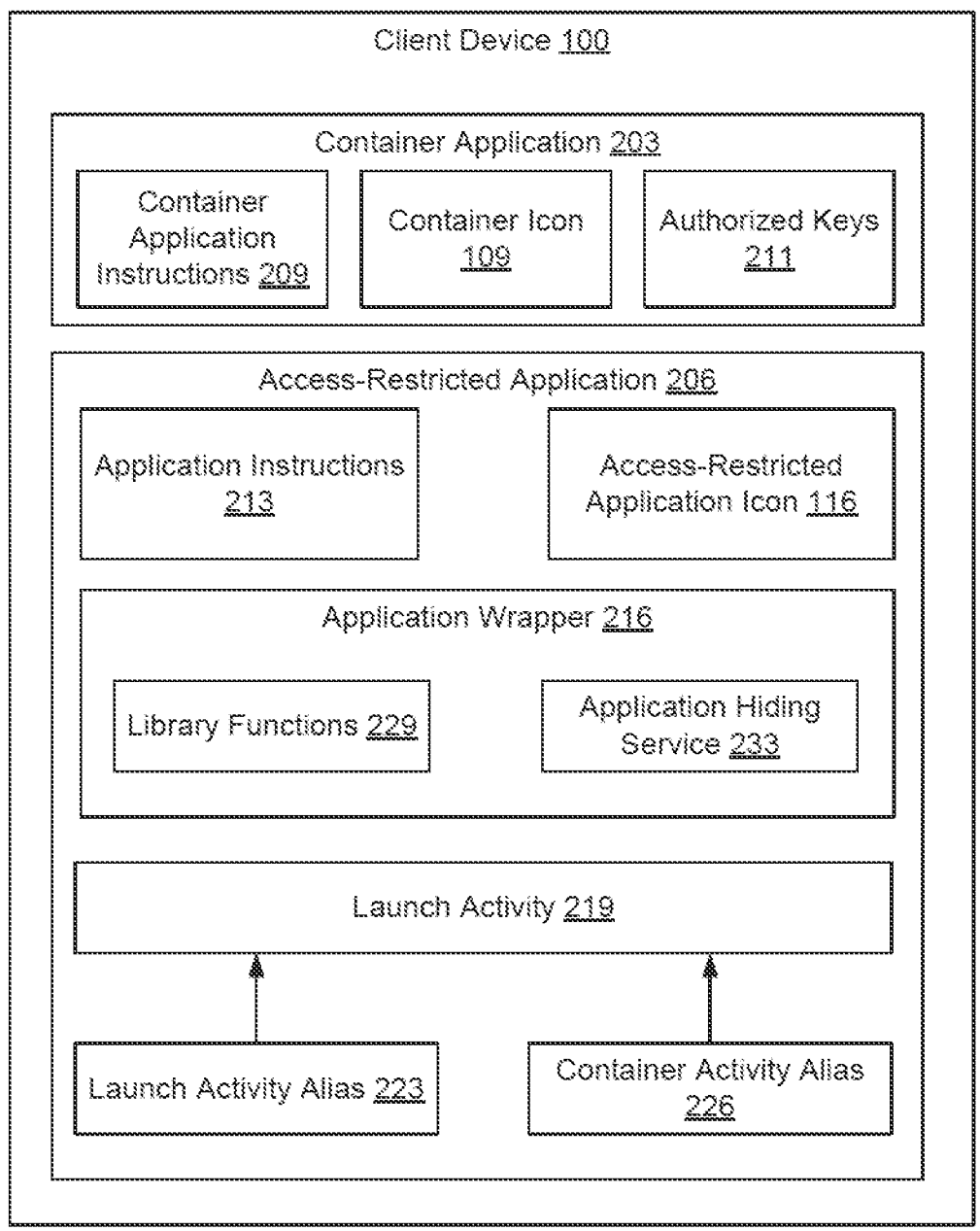
FIG. 2 is a schematic block diagram depicting an example implementation according to various examples of the disclosure.

With reference to FIG. 2, a schematic block diagram of the client device 100 and the various components of the present disclosure are illustrated. The client device 100 can include a processor-based system, such as a computer system. The computer system can be in the form of a desktop computer, a laptop computer, personal digital assistants, cellular telephone, smartphone, web pads, tablet computer systems, or other device with like capability. The client device 100 can include a screen 106 for displaying content. The screen 106 can correspond to liquid crystal display (LCD) displays, gas plasma-based flat panel displays, organic light emitting diode (OLED) displays, electrophoretic ink (E ink) displays, LCD projectors, or other types of display devices.

The client device 100 can be configured to execute various applications, including the container application 203, an access-restricted application 206, as well as other applications. The container application 203 can be executed in a client device 100, for example, to provide user access to the access-restricted application 206 in a controlled manner, as further described below. The access-restricted application 206 can be executed, for example, to perform various tasks on behalf of a user. To this end, the access-restricted application 206 can include a browser, an email application, a file viewer, a chat application, or various other applications installed on the client device 100. The client device 100 can be configured to execute applications beyond the access-restricted application 206 such as social networking applications, camera applications, media streaming applications (e.g., video, streaming, audio streaming, or photo streaming), or other applications installed by the user.

The container application 203 can include container application instructions 209 and data used by the container application 203, such as the container icon 109 and the identity of one or more authorized keys 211. The container application instructions 209 include machine-readable instructions executable by a processor of the client device 100 and stored in a memory of the client device 100. When executed by the processor of the client device 100, the container application instructions 209 can perform one or more functions associated with the container application 203 as further described below. The authorized keys 211 represent the identity of one or more cryptographic keys used to sign an application to certify the identity of the developer of the application, as further described below.

The access restricted application 206 can include application instructions 213, application wrapper 216, a launch activity 219, a launch activity alias 223, a container activity alias 226, and data used by the access-restricted application 206, such as the access-restricted application icon 116. The application instructions 213 include machine-readable instructions executable by a processor of the client device 100 and stored in a memory of the client device 100. When executed by the processor of the client device 100, the access-restricted application instructions 213 can perform one or more functions associated with the access-restricted application 206, as further described below.

The application wrapper 216 corresponds to a library, module, or similar package of machine-readable instructions that can be included in the access-restricted application 206. The application wrapper 216 can, for example, correspond to a third-party library or to a developer's library incorporated into his or her own program. The application wrapper 216 can be included in the access-restricted application 206 to provide additional functionality beyond those functions performed when the application instructions 213 are executed by the processor of the client device 100. These additional functions can be included in the library functions 229. The application wrapper 216 can also include additional machine-readable instructions in the form of an application hiding service 233, which can limit visibility of the access-restricted application 206 to the application container 113, as further described below.

The launch activity 219 represents the machine-readable instructions to be executed by the processor of the client device 100 in order to begin execution of the access-restricted application 206. The launch activity 219 can be invoked, for example, with a function call specifying the launch activity 219. For example, in the Android® operating system, an application that wishes to initiate execution of the access-restricted application 206 can send a message, referred to as an "Intent" in Android, to the access-restricted application 206. Other operating systems can provide similar mechanisms for initiating execution of an application.

The launch activity alias 223 provides a reference to the launch activity 219, allowing other applications to call or otherwise interface with the launch activity 219 in order to initiate execution of the access-restricted application 206. In some instances, the launch activity alias 223 can correspond to an application programming interface that can be called by other applications. In some instances, such as implementations on Android, the launch activity alias 223 can correspond to an "Intent filter" that defines the scope, classification, or parameters for initiation of the launch activity 219.

In Android implementations, the launch activity alias 223 can be defined in an entry in a manifest file corresponding to the access-restricted application 206. For example, the manifest file can contain an entry for the launch activity alias 223 that states: <action android:name="android.intent.action.MAIN"/> <category android:name="android.intent.category.LAUNCHER"/>

In Android implementations, the presence of the launch activity alias 223 allows other applications to identify that an application is installed and to initiate execution of the access-restricted application 206 by calling the launch activity 219. In the absence of the launch activity alias 223, other applications can be unable to call the launch activity 219.

The container activity alias 226 provides an alternate reference to the launch activity 219, allowing other applications to call or otherwise interface with the launch activity 219 in order to initiate execution of the access-restricted application 206. In some instances, the container activity alias 226 can correspond to an application programming interface that can be called by other applications. In some instances, such as implementations on Android, the launch activity alias 226 can correspond to an "Intent filter" that defines the scope, classification, or parameters for initiation of the launch activity 219.

In Android implementations, the container activity alias 226 can be defined in an entry in a manifest file corresponding to the access-restricted application 206. For example, the manifest file can contain an entry for the container activity alias 226 that states: <action android:name="android.intent.action.WORKSPACE_MAIN"/> <category android:name="android.intent.category.WORKSPACE_LAUNCHER"/> However, the container activity alias 226 can also be specified by identifiers other than "WORKSPACE_MAIN" and "WORKSPACE_LAUNCHER." In Android implementations, the presence of the container activity alias 223 allows other applications to initiate execution of the access-restricted application 206 by calling the launch activity 219. In contrast to the launch activity alias 223, which other Android applications executing on the client device 100 are aware of by default, the availability of the container activity alias 226 is limited to the container application 203 and other applications that are specifically programmed to be aware of the container activity alias 226. As a result, the ability of other applications to launch an access-restricted application 206 can be disabled because the other application be unaware that the access-restricted applications have been installed.

Next, a general description of the operation of the various components of the client device 100 is provided. To begin, when a new application, such as an access-restricted application 206, is installed on the client device 100, the container application 203 will receive a message indicating that the access-restricted application 206 has been installed. For example, the operating system can broadcast a "PACKAGE_ADDED" message in exemplary Android implementations. The container application 203 will then determine if the access-restricted application 206 is an application that is to be managed by the container application 203. For example, the container application 203 can determine whether the developer key used to sign the access-restricted application 206 is listed as an authorized key 211.

If the developer key is an authorized key 211, then the container application 203 will initiate the application hiding service 233 provided by the access-restricted application 206. The container application 203 can rely, for example, on the assumption that any application signed with a developer key that is an authorized key 211 will also include the application wrapper 216 in order to implement the application hiding service 233, or will have the ability to implement the application hiding service 233 by having been developed with an appropriate software development kit (SDK). In other examples, the access restricted application 206 can initiate the application hiding service 233.

The application hiding service 233 will then limit the ability of applications or services other than the container application 203 to launch the access-restricted application 206. For example, in implementations involving the Android operating system, the application hiding service 233 can parse the manifest file for activity components having the intent filter "action.Main" and "category.Launcher" and remove or otherwise disable these intent filters, thereby disabling the launch activity alias 223.

When the container application 203 renders an application container 113 on the screen 106, it will populate the application container 113 with the access-restricted application icon 116 of the access-restricted application 206 that it is managing. In order to determine whether an access-restricted application icon 116 should be included in the application container 113, the container application 203 can determine whether the access-restricted application 206 includes a container activity alias 226. If a container activity alias 226 is present, then the container application 203 can include the access-restricted application icon 116 in the application container 113. The access-restricted application icon 116 can also be removed from all other home launcher screens, in one example.

If a user manipulates the access-restricted application icon 116 displayed within the application container 113, then the container application 203 can initiate execution of the corresponding access-restricted application 206. The container application 203 can call the container activity alias 226 in order to invoke the launch activity 219. For example, in implementations involving the Android operating system, the container application 203 can fire or send an intent specifying "action.WORKSPACE_MAIN" and "category.WORKSPACE_LAUNCHER" to match the container activity alias 226 specified in the manifest file.

Figure 3:
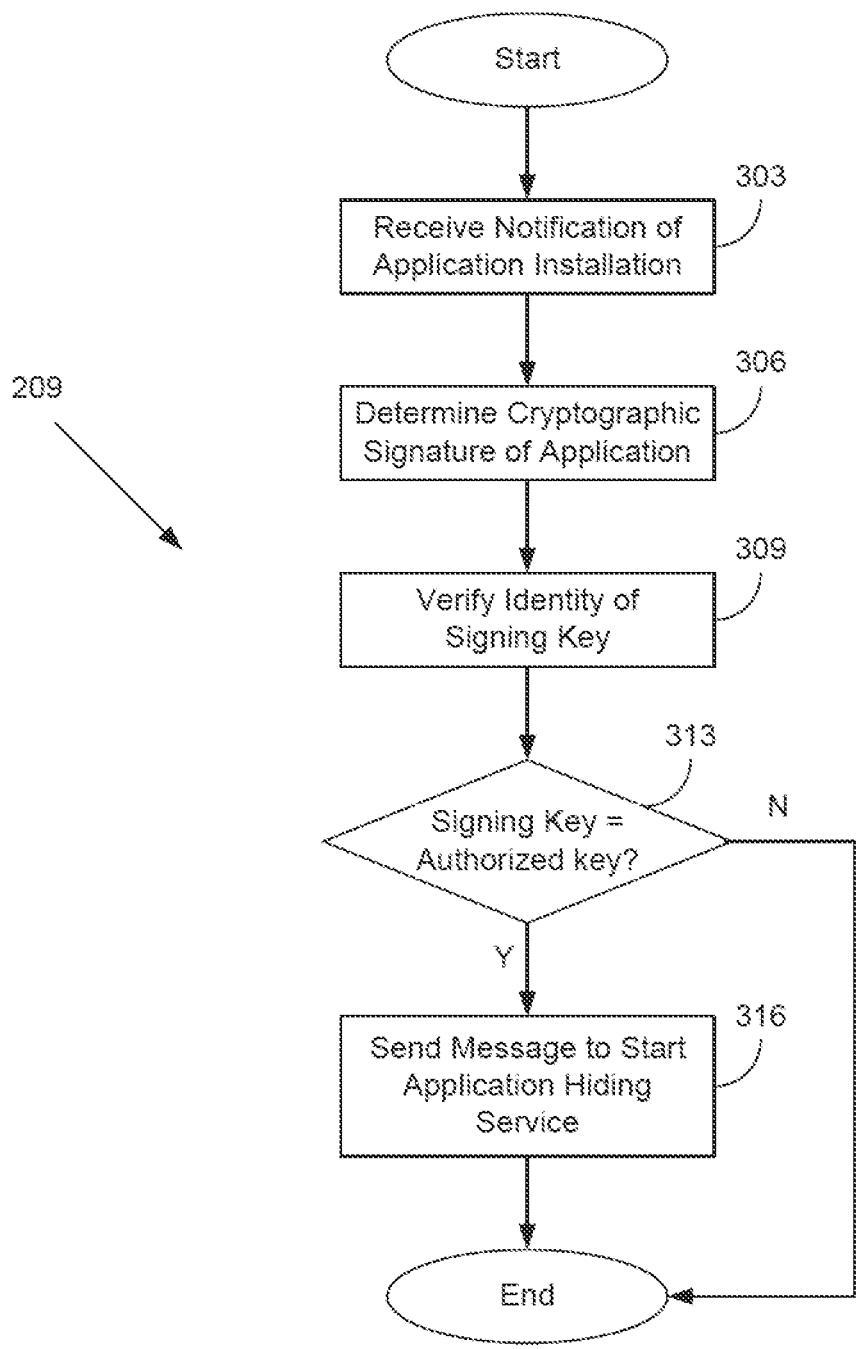
FIG. 3 is a flowchart illustrating one example of functionality according to various examples of the disclosure.

Referring next to FIG. 3, shown is a flowchart that provides one example of the operation of a portion of the container application instructions 209. As an alternative, the flowchart of FIG. 3 can be viewed as depicting an example of elements of a method implemented in the client device 100.

Beginning with step 303, the container application instructions 209 can execute to cause the processor of the client device 100 to receive a notification that an application has been installed. The notification could be provided by the operating system of the client device 100, a package manager responsible for installing applications on the client device 100, or from some other similar source. For example, in implementations where the Android operating system is installed on the client device 100, the Google Play store can provide the notification that an application has been installed. Notifications can be broadcasts that are received by the container application instructions 209 or can be a message intercepted by the container application instructions 209. Similarly, in embodiments where the iOS® operating system is installed on the client device 100, the Apple Store® can provide the notification that an application has been installed.

Moving on to step 306, the container application instructions 209 can execute to identify the cryptographic signature of the installed application. For example, the container application instructions 209 can cause the processor of the client device 100 to parse metadata stored in association with the installed application to retrieve the cryptographic signature.

Referring next to step 309, the container application instructions 209 execute to verify the identity of the cryptographic key used to generate the cryptographic signature of the installed application. For example, the container application instructions 209 can cause the processor of the client device 100 to parse metadata associated with the installed application to determine the identity of the cryptographic key. The container application instructions 209 can then compute a signature for the installed application using the identified cryptographic key and compare it with the signature identified previously in step 306. Matching signatures indicate that the identified key was the cryptographic key used to generate the signature identified in step 306.

Proceeding to step 313, the container application instructions 209 execute to determine if the cryptographic key verified in step 309 is included in the list of authorized keys 211. For example, the container application instructions 209 can compare the identifier of the cryptographic key with identifiers included in the list of authorized keys 211. If the cryptographic key is an authorized key 211, then execution proceeds to step 316. Otherwise, execution of the process subsequently ends.

Moving on to step 316, the container application instructions 209 execute to send a message to the installed application to start the application hiding service 233. Execution of the process subsequently ends.

Figure 4:
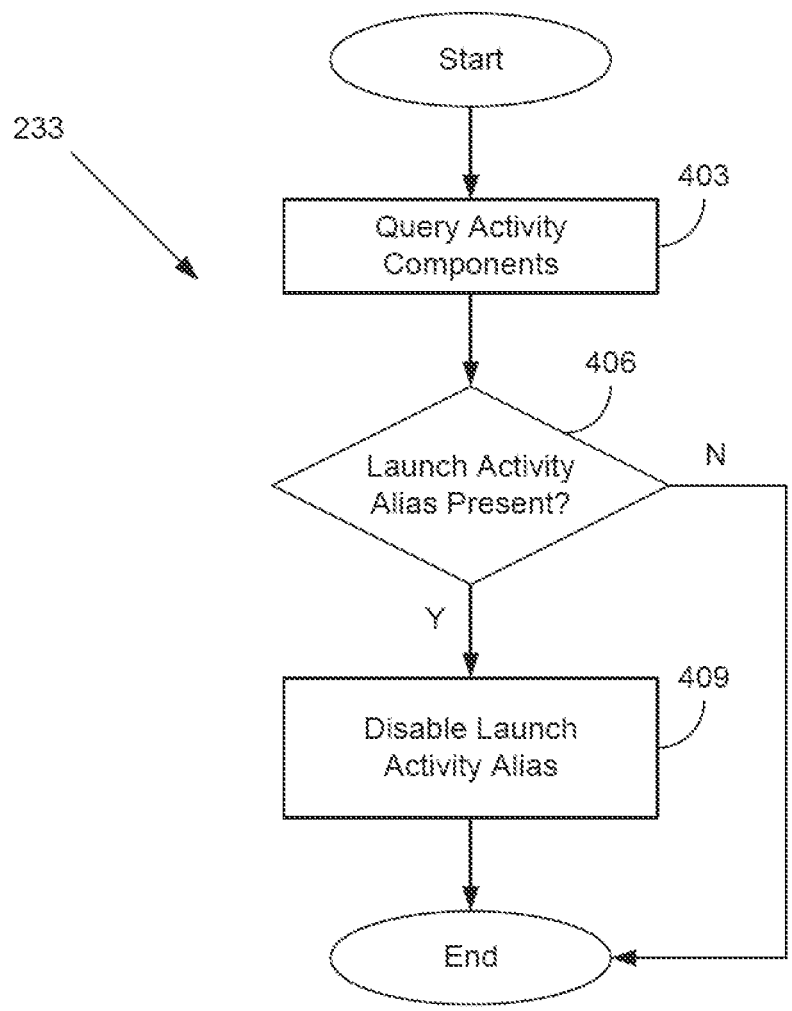
FIG. 4 is a flowchart illustrating one example of functionality according to various examples of the disclosure.

Referring next to FIG. 4, shown is a flowchart that provides one example of the operation of a portion of the application hiding service 233. As an alternative, the flowchart of FIG. 4 can be viewed as depicting an example of elements of a method implemented in the client device 100.

Beginning with step 403, the application hiding service 233 queries the activity components to identify whether a launch activity alias 223 is present. For example, in Android implementations, the application hiding service 233 can parse a manifest file associated with the installed application, such as an access-restricted application 206, to determine whether an Intent filter specifying "action.Main" and "category.Launcher" is listed in the manifest file. Similar approaches can be followed in implementations involving other operating systems, such as iOS.

Moving on to step 406, the application hiding service 233 determines whether the launch activity alias 223 is present. For example, the application hiding service 233 can determine that, in Android implementations, if an Intent filter specifying "action.Main" and "category.Launcher" is listed in the manifest file, then the launch activity alias 223 is present. Similar approaches can be followed in implementations involving other operating systems, such as iOS. If the launch activity alias 223 is present, then execution of the process proceeds to step 409. Otherwise, execution of the process ends.

Referring next to step 409, the application hiding service 233 disables the launch activity alias 223. In Android implementations, for example, the application hiding service 233 can remove or delete the launch activity alias 223 from the manifest file. Similar approaches can be followed in implementations involving other operating systems, such as iOS. Execution of the process then ends.

Figure 5:
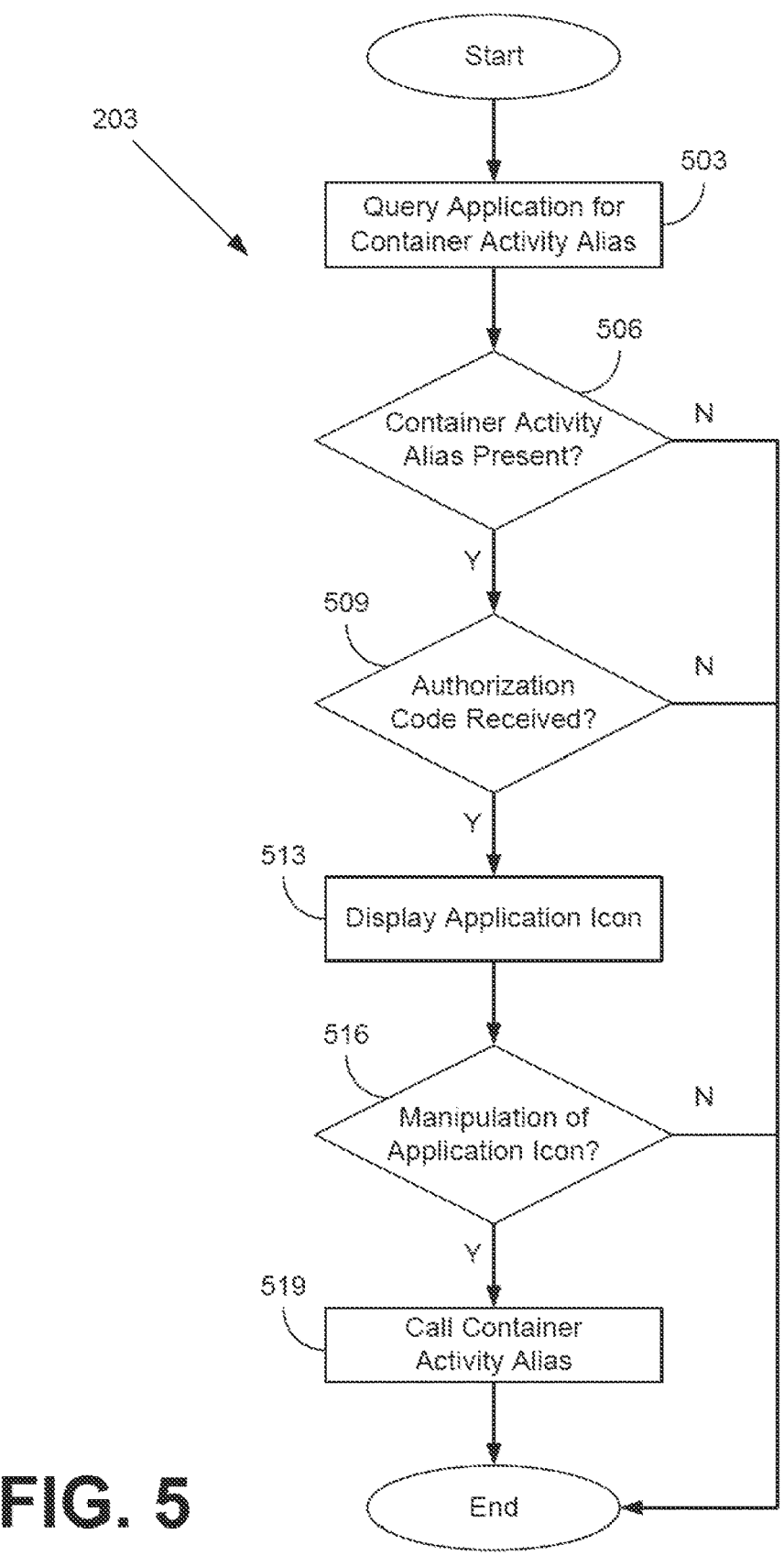
FIG. 5 is a flowchart illustrating one example of functionality according to various examples of the disclosure.

Referring next to FIG. 5, shown is a flowchart that provides one example of the operation of a portion of the container application instructions 209. As an alternative, the flowchart of FIG. 5 can be viewed as depicting an example of elements of a method implemented in the client device 100.

Beginning with step 503, the container application instructions 209 execute to query the access-restricted application 209 for the presence of the container activity alias 226. For example, the container application instructions 209 can cause the processor of the client device to determine that, in Android implementations, if an Intent filter specifying "action.WORKSPACE_MAIN" and "category.WORKSPACE_LAUNCHER" is listed in the manifest file, then the container activity alias 226 is present. Similar approaches can be followed in implementations involving other operating systems, such as iOS.

Moving on to step 506, the container application instructions 209 execute to determine whether the container activity alias 226 is present. For example, the container application instructions 209 can cause the processor of the client device to determine that, in Android implementations, if an Intent filter specifying "action.WORKSPACE_MAIN" and "category.WORKSPACE_LAUNCHER" is listed in the manifest file, then the container activity alias 226 is present. Similar approaches can be followed in implementations involving other operating systems, such as in the case of iOS. If the container activity alias 226 is present, then execution of the process proceeds to step 509. Otherwise, execution of the process ends.

Referring next to step 509, the container application instructions 209 execute to determine whether an authorization code has been received. In some instances, the container application instructions 209 can require that an authorization code be supplied by a user before the application container 113 is displayed. The authorization code can include a personal identification number (PIN), a password, a figure drawn on the screen 106 of the client device 100, or various other forms of authentication. If the container application instructions 209 determine that the correct authorization code has been received, then execution of the process proceeds to step 513. Otherwise, execution of the process subsequently ends.

Proceeding to step 513, the container application instructions 209 cause the processor of the client device 100 to display the access-restricted application icon 116 in the application container 113.

Moving on to step 516, the container application instructions 209 execute to determine whether the access-restricted application icon 116 has been manipulated. For example, the container application instructions 209 can cause the processor of the client device 100 to determine whether a user has tapped an area of the screen near the access-restricted application icon 116 or performed some other manipulation of the access-restricted application icon 116. If the access-restricted application icon 116 has been manipulated, then execution of the process proceeds to step 519. Otherwise, execution of the process subsequently ends.

Referring next to step 519, the container application instructions 209 execute to cause the processor of the client device 100 to call the container activity alias 226 in order to invoke the launch activity 219. For example, in implementations involving the Android operating system, the container application 203 can fire or send an intent specifying "action.WORKSPACE_MAIN" and "category.WORKSPACE_LAUNCHER" to match the container activity alias 226 specified in the manifest file. Similar approaches can be followed in implementations involving other operating systems, such as iOS. Execution of the process subsequently ends.

The flowcharts of FIG. 3, FIG. 4, and FIG. 5 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIG. 3, FIG. 4, and FIG. 5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 100, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The container application 203, the access-restricted application 206, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
   a computing device comprising a processor and a memory;
   an application hiding service stored in the memory of the computing device that, when executed by the processor of the computing device, causes the computing device to at least:
      remove a default launch activity alias for a user application from a manifest file corresponding to the user application, the default launch activity alias comprising a first reference to an application programming interface (API) to initiate execution of the user application; and
   a container application stored in the memory of the computing device that, when executed by the processor of the computing device, causes the computing device to at least:
      send a message to the application hiding service to remove the default launch activity alias for the user application from the manifest file, wherein the message is sent based on a determination that an identity of a cryptographic key corresponding to a cryptographic signature of the user application matches an identity of an authorized key;
      identify, in the manifest file, a container activity alias specified for the user application, wherein the container activity alias comprises a second reference to the API to initiate execution of the user application;
      display an application icon representing the user application based at least in part on the container activity alias; and
      call the container activity alias for the user application based at least in part on a manipulation of the application icon.

2. The system of claim 1, wherein the container application, when executed by the processor of the computing device, further causes the computing device to at least:
   display a container icon; and
   display the application icon based at least in part on a manipulation of the container icon.

3. The system of claim 2, wherein display of the application icon is further based at least in part a receipt of an authorization code by the container application.

4. The system of claim 3, wherein the authorization code is a figure drawn on a screen of the computing device.

5. The system of claim 1, wherein the container application, when executed by the processor of the computing device, further causes the computing device to at least display an application container, wherein the application icon is displayed within the application container.

6. The system of claim 1, wherein the container activity alias is defined in a manifest file associated with the user application.

7. The system of claim 1, wherein the user application comprises a third-party library that comprises the application hiding service.

8. A computer-implemented method, comprising:
   removing a default launch activity alias for a user application from a manifest file corresponding to the user application based on determining that an identity of a cryptographic key corresponding to a cryptographic signature of the user application matches an identity of an authorized key, the default launch activity alias comprising a first reference to an application programming interface (API) to initiate execution of the user application;
   identifying, in the manifest file, a container activity alias specified for the user application, wherein the container activity alias comprises a second reference to the API to initiate execution of the user application;
   displaying an application icon representing the user application based at least in part on the container activity alias; and
   calling the container activity alias for the user application based at least in part on a manipulation of the application icon.

9. The method of claim 8, further comprising:
   displaying a container icon; and
   displaying the application icon based at least in part on a manipulation of the container icon.

10. The method of claim 9, further comprising:
    receiving an authorization code; and
    wherein displaying the application icon is further based at least in part on receiving the authorization code.

11. The method of claim 10, wherein the authorization code comprises a personal identification number (PIN).

12. The method of claim 10, wherein the authorization code is a figure drawn on a screen of the computing device.

13. The method of claim 8, further comprising displaying an application container, wherein the application icon is displayed within the application container.

14. The method of claim 8, wherein the container activity alias is defined in a manifest file associated with the user application.

15. A non-transitory computer-readable medium storing a plurality of computer instructions executable by a computing device, the plurality of computer instructions being configured to cause the computing device to at least:
    remove a default launch activity alias for a user application from a manifest file corresponding to the user application based on a determination that an identity of a cryptographic key corresponding to a cryptographic signature of the user application matches an identity of the authorized key, the default launch activity alias comprising a first reference to an application programming interface (API) to initiate execution of the user application;

identify, in the manifest file, a container activity alias specified for the user application, wherein the container activity alias comprises a second reference to the API to initiate execution of the user application;

display an application icon representing the user application based at least in part on the container activity alias; and call the container activity alias for the user application based at least in part on a manipulation of the application icon.

16. The non-transitory computer-readable medium of claim 15, wherein the plurality of computer instructions are further configured to cause the computing device to at least:

display a container icon; and display the application icon based at least in part on a manipulation of the container icon.

17. The non-transitory computer-readable medium of claim 16, wherein display of the application icon is further based at least in part a receipt of an authorization code by the container application.

18. The non-transitory computer-readable medium of claim 17, wherein the authorization code is a figure drawn on a screen of the computing device.

19. The non-transitory computer-readable medium of claim 15, wherein the plurality of computer instructions are further configured to cause the computing device to at least display an application container, wherein the application icon is displayed within the application container.

20. The non-transitory computer-readable medium of claim 15, wherein the container activity alias is defined in a manifest file associated with the user application.

* * * * *